United States Patent [19]
Shimojo

[11] Patent Number: 5,641,447
[45] Date of Patent: Jun. 24, 1997

[54] METHOD OF MOLDING A DISC SUBSTRATE

[75] Inventor: Shunichi Shimojo, Ohbu, Japan

[73] Assignee: Kabushiki Kaisha Meiki Seisakusho, Aichi-ken, Japan

[21] Appl. No.: 510,340

[22] Filed: Aug. 2, 1995

[30] Foreign Application Priority Data

Jan. 10, 1995 [JP] Japan ..................... 7-018488

[51] Int. Cl.⁶ .............. B29C 45/04; B29C 45/73
[52] U.S. Cl. ................ 264/328.11; 264/328.16
[58] Field of Search ...................... 264/1.33, 106, 264/328.1, 328.11, 328.16

[56] References Cited

U.S. PATENT DOCUMENTS 4,879,082   11/1989   Kudo et al. ........................ 264/106
4,986,938   1/1991    Izuka et al. ........................ 264/1.33

FOREIGN PATENT DOCUMENTS 2-19774   1/1990   Japan.

Primary Examiner—Leo B. Tentoni
Attorney, Agent, or Firm—Oliff & Berridge

[57] ABSTRACT

A method of molding a disc substrate, includes the steps of: fitting a movable die and a fixed die for a disc substrate onto a movable platen and a fixed platen of a molding machine, respectively; bringing the movable die and the fixed die in close contact with each other through a mold closing operation where the movable platen moves through a mold clamping cylinder; filling a given quantity of melting resin into a cavity of the movable and fixed dies for the disc substrate from a nozzle of an injection unit through a screw within a heating cylinder in a state where a mold clamping hydraulic pressure is zero; and after the completion of the injection process, implementing a mold clamping pressure control of one stage or a plurality of stages by application of a mold clamping pressure, and simultaneously conducting a process of cooling a melting resin.

7 Claims, 8 Drawing Sheets

METHOD OF MOLDING A DISC SUBSTRATE

BACKGROUND OF THE INVENTION

1. Field of the Invention

The present invention relates to a method of molding a disc substrate having an improved structure, and particularly to a method of molding a disc substrate which is improved in quality, and more particularly to a method of molding a disc substrate which allows an optical disc to be manufactured stably and with high moldability.

2. Description of the Related Art

Figure 4:
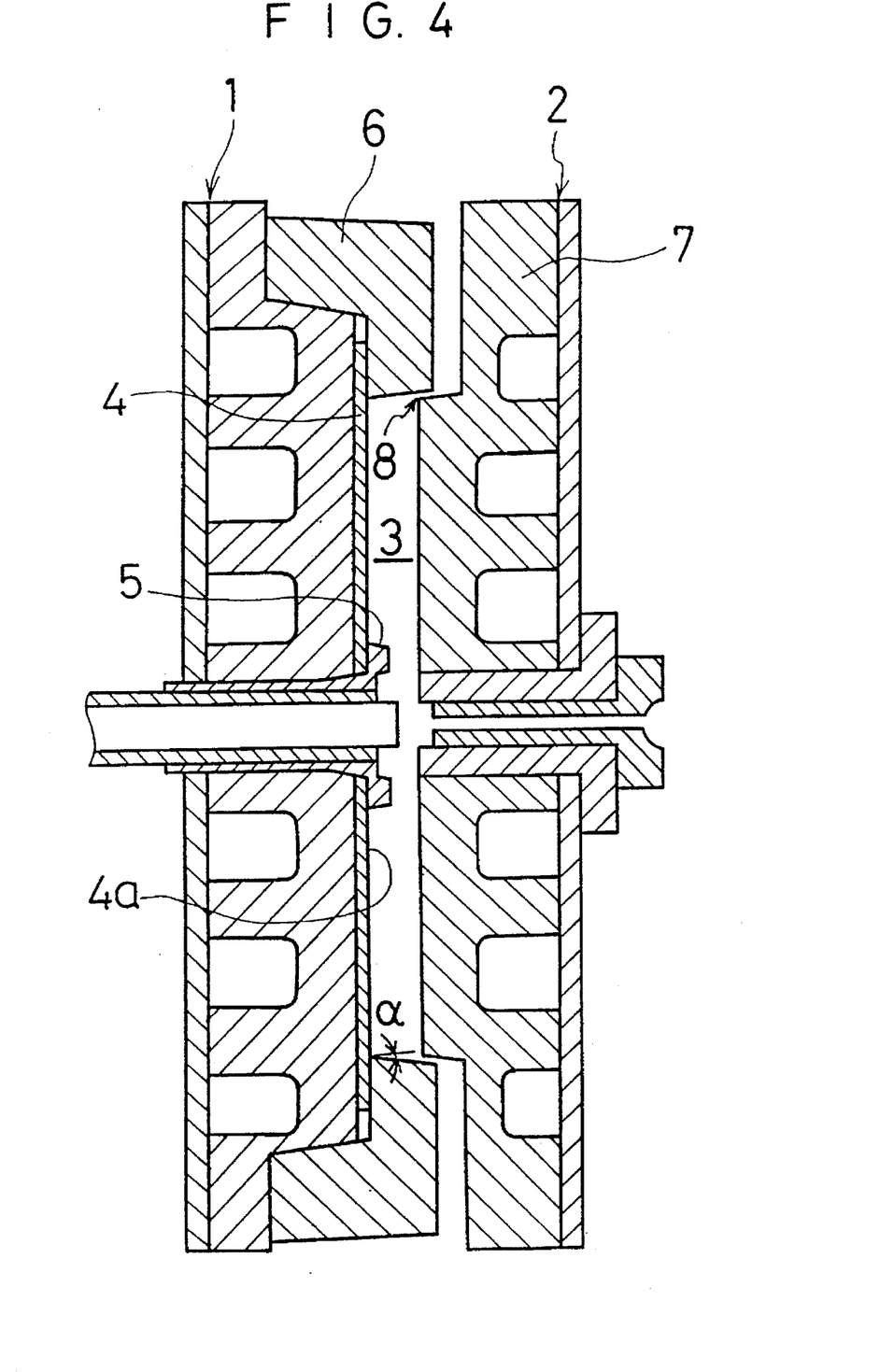
FIG. 4 is a cross-sectional diagram showing the main portion of a disc die used in the molding method in accordance with the present invention.

Conventionally, a disc die for manufacturing an optical disc such as a video disc or a compact disc, or the like is so constituted that a predetermined stamper 4 is arranged within a product cavity 3 which is comprised of a movable die 1 and a fixed die 2 as shown in FIG. 4, and the inner and outer peripheries of the stamper 4 are fixed by stamper pressing rings 5 and 6, respectively. Also, a surface 4a of the stamper 4 is formed with spiral or concentric circular irregular pits for transferring record information data onto the disc.

In general, there has been adopted an injection molding method in which molten resin is filled into the cavity from an injection unit after a mold clamping process, and the information of the stamper surface 4a which is exposed from one surface of the cavity 3 is transferred onto a resin material which is to be solidified to thereby mold the disc substrate.

Figure 5:
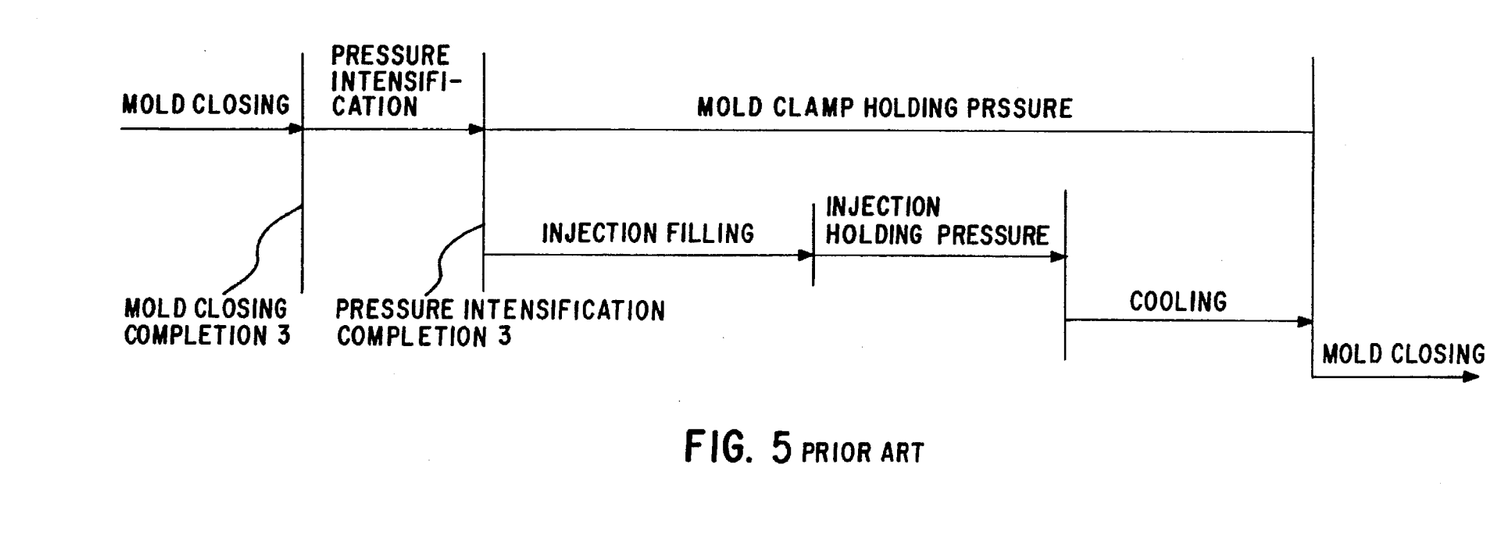
FIG. 5 is a diagram showing an operating process of the procedure of molding a disc substrate in accordance with a conventional example.
Figure 6:
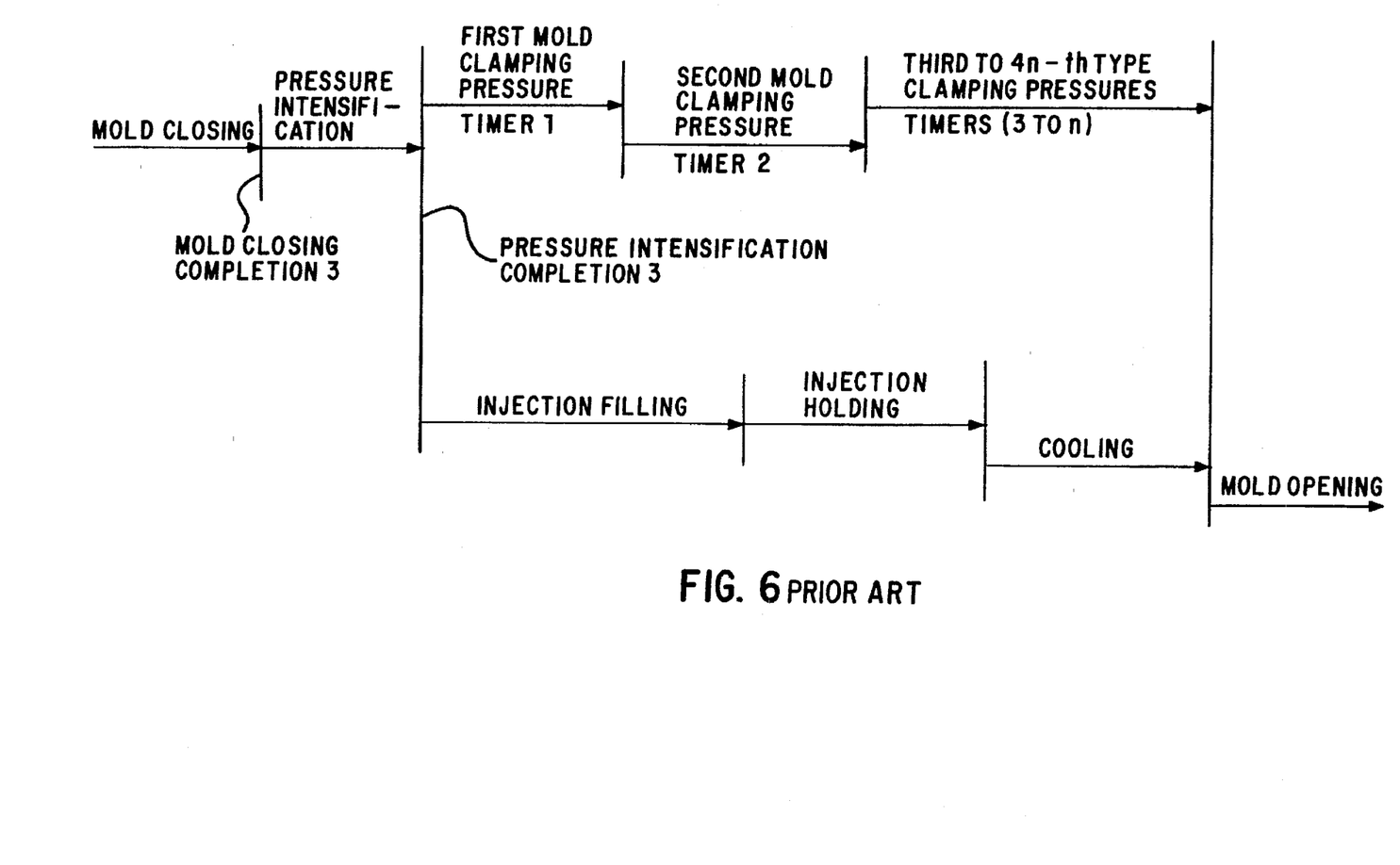
FIG. 6 is a diagram showing an operating process of the procedure of molding a disc substrate in accordance with another conventional example.

The conventional injection molding method is implemented in such a manner where, in an operating process, for example, as shown in FIG. 5, after the completion of mold closing operation, an internal cavity pressure is intensified, and a series of molding cycle is conducted with each of an injection filling process, an injection pressure holding process, and a cooling process under a state where a mold clamping pressure is held. Also, in FIG. 6, an effort was made to manufacture an improved product in such a manner that the mold clamping pressure is adjusted by controlling a first clamping pressure, a second clamping pressure, or also a multi-stage clamping pressure (3 to n times) upwardly or downwardly, with the setting of a plurality of timers.

In such an injection molding operation for the disc substrate, the clamping force is required to be such a degree that the paired molds are prevented from opening even though a resin material is filled into the mold. For example, the clamping force of 40 tons or more in the case of a disc substrate having a diameter of 120 mm, and the clamping force of 200 tons or more in the case of a disc substrate having a diameter of 300 mm are required, respectively.

The stamper 4 is fixed onto the inside of the cavity 3 in such a manner that the inner peripheral portion of the stamper 4 which is usually in the form of a doughnut is fixed onto the movable die 1 through appropriate fixing means, and the outer peripheral portion thereof is clamped by the stamper pressing ring 6 shown in FIG. 4. A gas removal portion 8 is formed at a given interval with a stamper pressing angle α of approximately 7°, for exhausting gas extruded from the inside of the cavity to the exterior in the filling of a predetermined resin material into the cavity between a mirror plate 7 of the fixed die 2 and the stamper surface 4a.

In the conventional molding method of such a structure, because of a narrowed molding condition, the quality of the resultant products is largely dispersed, and its yield is lowered. In addition, a large injection pressure for filling a predetermined resin material into the product cavity makes a pressure stripe formed on the peripheral portion of the molded disc substrate, as a result of which the quality of the product is dispersed between the inner peripheral portion and the outer peripheral portion of the stamper 4, in particular, there arises a problem that the index of double refraction of the product is changed.

In the molding of the disc substrate, the improvements in a transfer, the index of double refraction, and the mechanical characteristics of a warp, a plane and the like are demanded as important items. However, the molding of a substance which is thin in its thickness and large in its projected area as in the disc substrate makes it difficult to satisfy all of those characteristics. Moreover, the applicability of the disc substrate is expanded in the future, and specification values are made strict such that the thickness of 1. mm at the present time will tend to be still thinner in the future. Also, a study has been made of using two layered disc substrates each having a thickness of 0.6 mm, which have been stuck on one another, etc. Under such existing circumstances, there is a limit to manufacture a product coping with the specification which has been demanded in the conventional molding method.

For that reason, there has been proposed, in Japanese Patent Examined Publication No. Hei 2-19774, an injection molding method for a disc substrate which is characterized as follows: A resin material is injected within a product cavity under a primary injection pressure where a mold opening force which is slightly larger than a mold clamping force is exerted on the movable die so that the quantity of resin necessary for forming a desired disc substrate is injected into the product cavity. At that instant, the injection pressure is changed over to a secondary injection pressure where the mold opening force which is exerted on the movable die is smaller than the mold clamping force, thereby filling the injected resin material into the product cavity through the mold clamping force. Simultaneously, a gas extruded from the product cavity with the filling operation is exhausted from a gap defined between an inner side surface of the stamper pressing member and a rising wall surface of a stepped portion of the fixed die side.

However, in the conventional molding method, after the completion of the mold closing operation, the mold clamping pressure is intensified up to a certain pressure for controlling the mold clamping pressure. Also, in the injection compression molding method, after the injection filling is completed, the mold clamping pressure rises and falls while applying the injection holding pressure. As a result, those methods have been adversely affected by the fluctuation of pressure and the accuracy in the control of a pressure control valve in a hydraulic circuit.

Further, even in the invention disclosed in the foregoing publication, the pressure control is necessarily conducted with accuracy, and there is a case where a pressure balance between the primary and secondary injection pressures both acting as the mold opening force and the mold clamping force is hard to adjust.

Therefore, in such a molding method, the injection pressure is difficult to control, and for the purposes of keeping the index of double refraction within a specification value in the molding of a thin substrate as in a disc having a thickness of 0.6 mm, it is necessary to set the temperature of the die to a value close to a thermal deformation temperature (120° C. or higher in the case of a polycarbonate resin) of resin, and also to have a long cooling period. However, even in this case, there is a limit that the index of double refraction of a completed product is restrained within a range of 60 to 80 nm at the best in a double pass. Moreover, the mechanical characteristics such as the tilt (a microscopic warp of the laser beam incident and reflected portion of the substrate) of the product, etc. remarkably exceed a standard value.

Furthermore, the disc molding technique is under the circumstances where the specification of a high-density disc becomes more strict in the future.

SUMMARY OF THE INVENTION

In view of the foregoing circumstances, an object of the present invention is to provide a method of molding a disc substrate which is excellent in the index of double refraction and improved in the mechanical characteristic by shortening a cycle time of molding operation.

In order to achieve the foregoing objects, a first aspect of the present invention provides a method of molding a disc substrate, which comprises the steps of:

fitting a movable die and a fixed die for a disc substrate onto a movable platen and a fixed platen of a molding machine, respectively;

bringing said movable die and said fixed die in close contact with each other through a mold closing operation where said movable platen moves through a mold clamping cylinder;

filling a given quantity of melting resin into a cavity of said movable and fixed dies for the disc substrate from a nozzle of an injection unit through a screw within a heating cylinder in a state where a mold clamping hydraulic pressure is zero; and after the completion of the injection process, implementing a mold clamping pressure control of one stage or a plurality of stages by application of a mold clamping pressure, and simultaneously conducting a process of cooling a melting resin.

A second aspect of the present invention provides a method of molding a disc substrate in accordance with the first aspect of the invention, wherein the screw within the heating cylinder in the injection filling operation is advanced to its movable limit, the quantity of a cushion of the melting resin is eliminated, and a given quantity of melting resin is injected.

BRIEF DESCRIPTION OF THE DRAWINGS

The accompanying drawings which are incorporated in and constitute a part of this specification illustrate embodiments of the invention and together with the description serve to explain the objects, advantages and principles of the invention. In the drawings.

DETAILED DESCRIPTION OF THE PREFERRED EMBODIMENT

Figure 1:
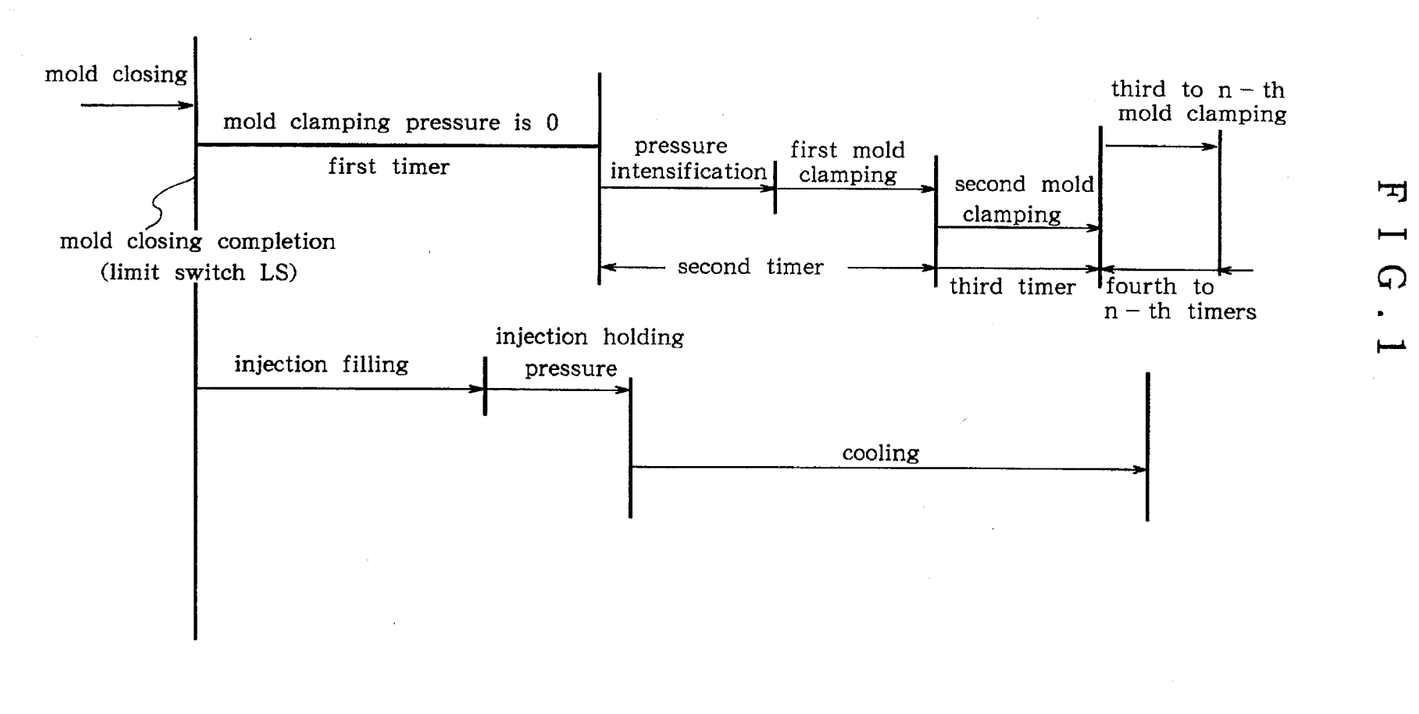
FIG. 1 is a diagram showing an operating process in a method of molding a disc substrate in accordance with the present invention.
Figure 2:
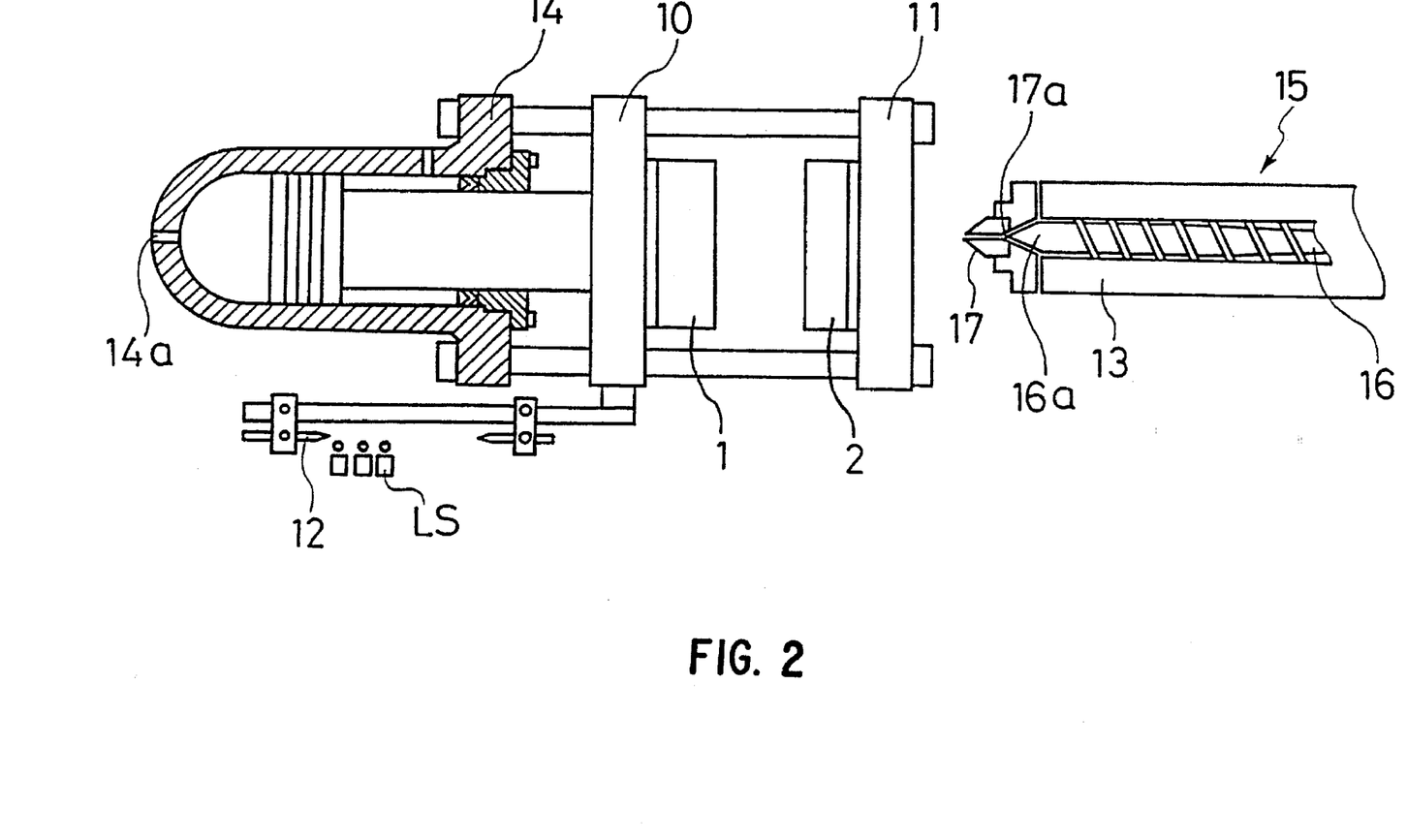
FIG. 2 is a structural diagram showing the main portion of a known molding machine for executing the molding method of FIG. 1.

A description will be given of an embodiment of the present invention with reference to the accompanying drawings. FIG. 1 is a diagram showing an operating process for explaining the procedure of a disc substrate molding method in accordance with the present invention. FIG. 2 is a diagram showing the basic mechanism of a mold clamping unit and a heating cylinder in a known molding machine used for executing the molding method of this embodiment.

The molding operation of a disc substrate starts from a preliminary work where a movable die 1 and a fixed die 2 for a disc substrate die assembly are fixed to respective predetermined positions of a movable platen 10 and a fixed platen 11 of an injection molding machine. Then, the position of a cam 12 or the like is determined so that a limit switch LS is activated when the paired movable and fixed molds 1 and 2 are closed so as to be in close contact with each other. Also, a melting resin within a heating cylinder 13 is heated to a set temperature in advance together with the molding work, and the setting of a temperature, a pressure or the like on an operating platen and the control of a temperature by a die temperature adjusting unit are implemented.

After the completion of the foregoing preliminary work, a mold clamping cylinder 14 is activated so as to conduct a mold closing operation where the movable die 1 and the fixed die 2 are fitted onto each other through the movement of the movable platen 10, and a cam 12 arrives at a position set by the limit switch LS in advance, with the result that the mold closing operation is completed.

Upon the completion of the foregoing mold closing operation, a first timer is activated, and the supply of an oil from a hydraulic unit to a port 14a of the mold clamping cylinder 14 is suspended so that the mold clamping hydraulic pressure becomes zero for a predetermined set period of time. An injection unit 15 is abutted against a locating ring (not shown) of the fixed platen 11 in advance. Simultaneously with the activation of the first timer, or for example, 0.01 seconds after the activation of the first timer through a delay circuit, the injection unit 15 injects and fills a given quantity of melting resin into a cavity 3 of the disc substrate die assembly from a nozzle 17 through a screw 16 within the heating cylinder in a state where the mold clamping pressure is zero. Then, an injection holding pressure is applied to the injection unit so that the inside of the cavity is uniformly filled with the melting resin at the post-stage of the injection filling operation. Thus, the injection filling process is completed.

In this embodiment, the screw 16 within the heating cylinder in the injection filling operation is advanced to a mechanical movable limit, that is, until a screw tip portion 16a collides with a nozzle inner end portion 17a with a microscopic gaps so that the quantity of cushion of the melting resin is eliminated. For that reason, if the quantity of injected resin is more than the quantity of resin filled into the mold cavity, the die assembly becomes opened. Accordingly, the degree of opening of the die assembly is adjusted by an injection stroke. In this example, a given quantity of melting resin is injected into the cavity so that the degree of opening of the die assembly into which the resin has been injected and filled is 150 to 200 μm.

Subsequently, a cooling process for solidifying the resin starts simultaneously with the completion of the injection filling process, and a mold clamping process starts after the completion of operating the first timer. Usually, the mold clamping process starts simultaneously with the cooling process about 0.2 seconds after the completion of the injection filling process. In the mold clamping process, the mold clamping pressure is first intensified, and a first mold clamping pressure is maintained during a set time of the second timer. Then, a set pressure is made lower than the first mold clamping pressure to conduct a second mold clamping pressure during a set time of the third timer. Furthermore, the third to n-th mold clamping operation of a multi-stage may be continued using the fourth to n-th timers.

Figure 3:
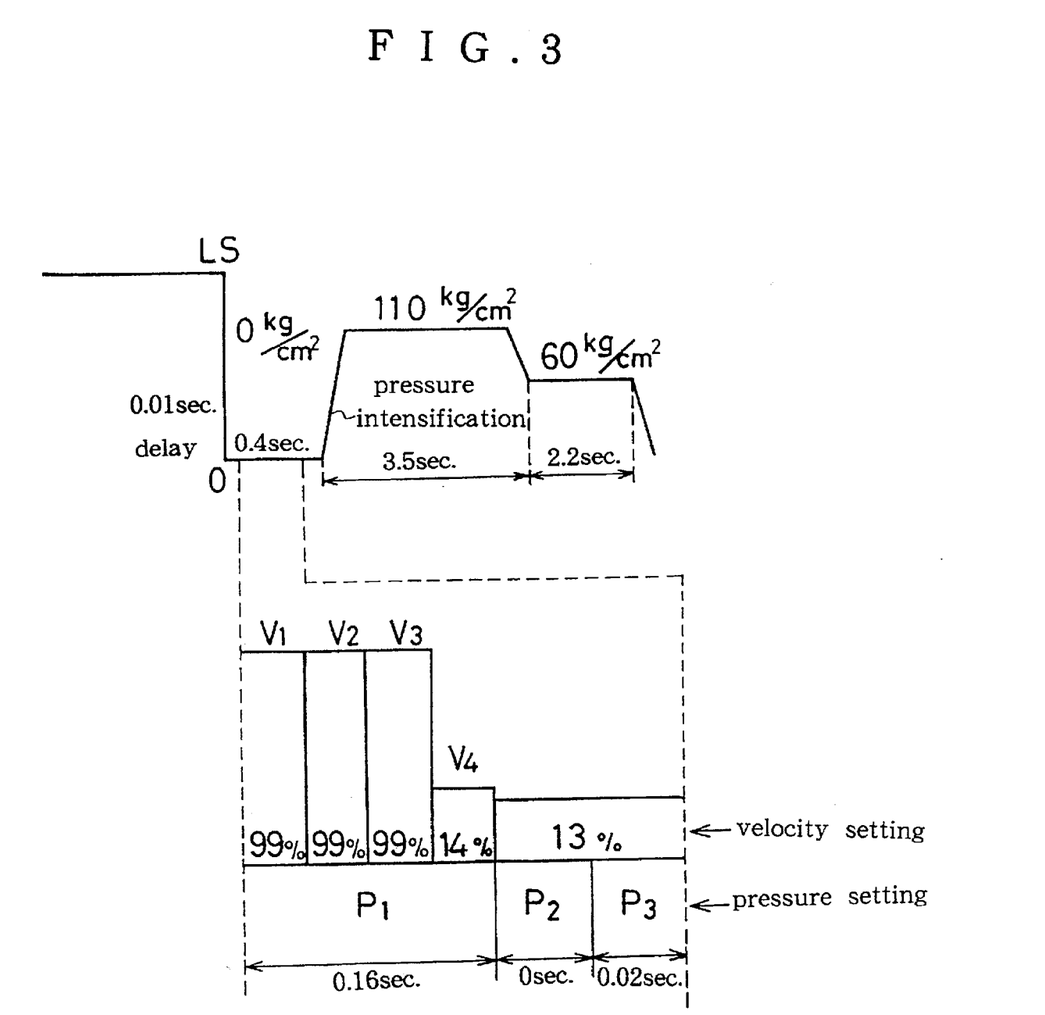
FIG. 3 is a diagram of an operating state showing set values of the pressure and velocity in the mold clamping operation and the injection operation as a time elapses in the method of molding a disc substrate in accordance with the present invention.

This embodiment, as shown in FIG. 3, has two-stage mold clamping operation such that the first mold clamping hydraulic pressure is set to 110 kg/cm$^2$, and the second mold clamping hydraulic pressure is set to 60 kg/cm$^2$. It should be noted that, when the mold clamping hydraulic pressure is 140 kg/cm$^2$, the mold clamping force becomes 25 tons. Also, the set time of the respective timers is such that the set time of the first timer is 0.4 sec, the second timer is 3.5 sec and the third timer is 2.2 sec.

The injection velocity and injection pressure of the injection unit which injects a melting resin in a state where the mold clamping pressure is zero are shown in the lower portion of FIG. 3, where the injection speed is of four stages, and the injection pressure is of three stages. The injection velocities $V_1$, $V_2$ and $V_3$ under the primary injection pressure $P_1$ are set to be of the maximum velocities (the maximum velocity at 99%), respectively. $V_4$ is set to be 14% of the maximum velocity, and further, it is set to be 13% of the maximum velocity under the injection holding pressures $P_2$ and $P_3$.

Further, the primary injection pressure $P_1$ and the injection holding pressures $P_2$ and $P_3$ are held in the maximum state where the pressure set value exhibits the maximum value of a setter from the start to the end, and the respective set time is set to 0.16 sec, 0 sec (that is, skipping) and 0.02 sec in order, so that two stages of the injection pressure $P_1$ and $P_3$ are conducted with the elimination of the secondary injection pressure $P_2$. It should be noted that the foregoing set conditions are of optimum values in the case where a resin material is of a polycarbonate resin, the temperature of the die assembly is 115° C., and the degree of opening of the die assembly into which resin has been injected and filled is 150 to 200 μm.

Further, as the countermeasure for removing gas in the filling of melting resin into the cavity, an angle α (refer to FIG. 4) of the stamper pressing by the stamper pressing ring disposed in the outer periphery of the stamper is changed from the conventional angle 7° to 3.5°, thereby being capable of restraining a burr from occurring.

Figure 7:
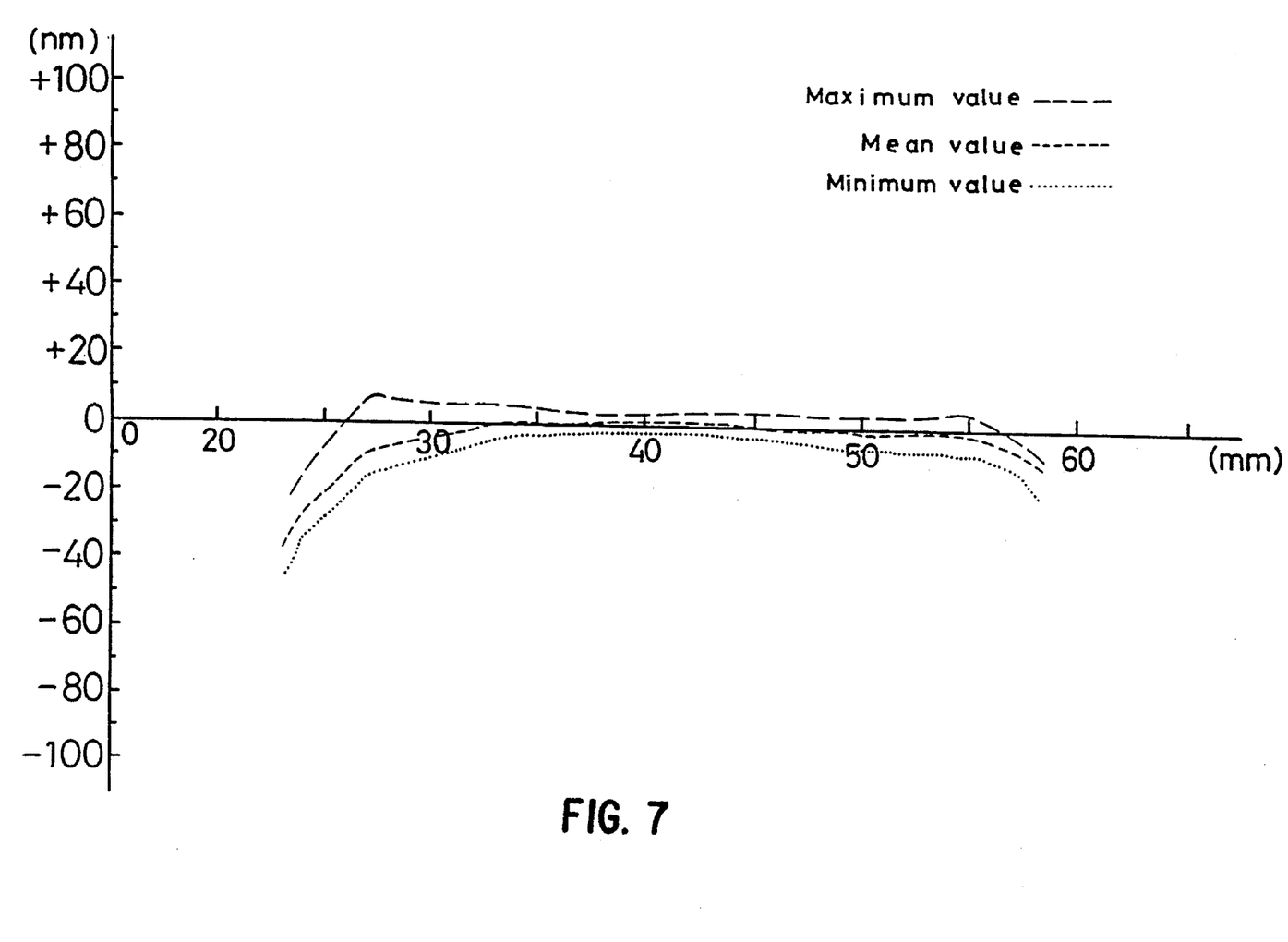
FIG. 7 is a graph showing measured data obtained in accordance with the molding method of the present invention being plotted.
Figure 8:
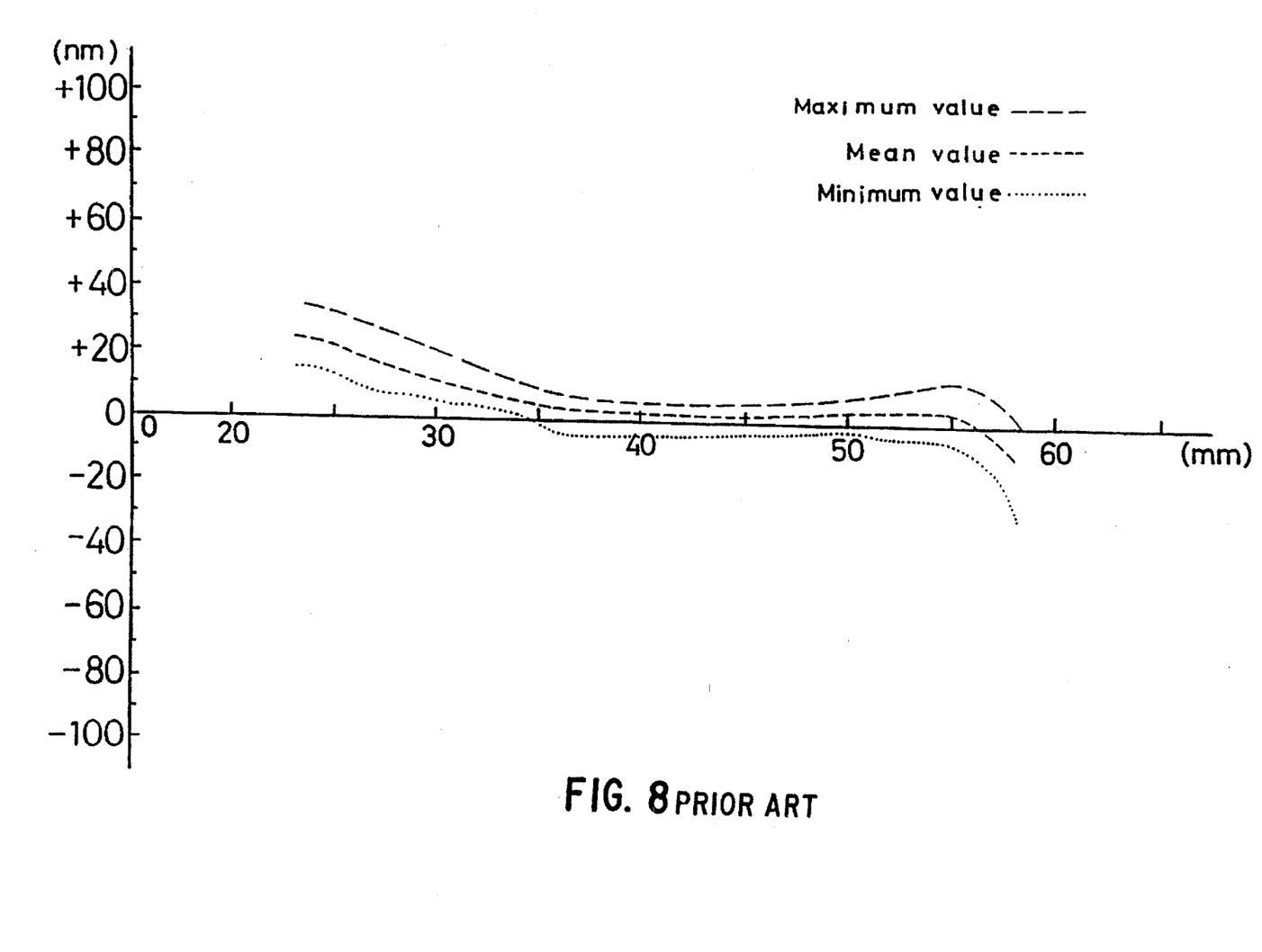
FIG. 8 is a graph showing measured data obtained in accordance with the molding method of the conventional example being plotted.

The measured values of data of the index of double refraction in the case of the embodiment of the present invention and the conventional example will be indicated as follows, and graphs exhibiting the relationship of those numerical values are shown in FIGS. 7 and 8.

(Measured Data of This Embodiment)

| Measured position (radius: mm) | Maximum value | Minimum value | Mean value | Measured position (radius: mm) | Maximum value | Minimum value | Mean value |
| --- | --- | --- | --- | --- | --- | --- | --- |
| 23 | −24.62 | −46.54 | −36.84 | 42 | +3.72 | −1.74 | +1.51 |
| 24 | −15.38 | −33.80 | −25.71 | 45 | +4.56 | −2.82 | +1.09 |
| 27 | +7.62 | −15.28 | −8.66 | 50 | +2.29 | −5.96 | −1.39 |
| 33 | +5.56 | −3.94 | +0.30 | 55 | +5.24 | −7.18 | −1.29 |
| 36 | +4.00 | −2.66 | +0.32 | 57 | −2.32 | −11.62 | −5.56 |
| 38 | +3.38 | −1.74 | +1.38 | 58 | −5.62 | −17.38 | −9.62 |

(Measured values of the Conventional Example)

| Measured position (radius: mm) | Maximum value | Minimum value | Mean value | Measured position (radius: mm) | Maximum value | Minimum value | Mean value |
| --- | --- | --- | --- | --- | --- | --- | --- |
| 23 | +34.02 | +16.50 | +25.20 | 42 | +6.52 | −4.90 | +1.96 |
| 24 | +35.44 | +15.38 | +24.83 | 45 | +8.48 | −4.42 | +1.75 |
| 27 | +28.25 | +8.32 | +16.87 | 50 | +8.20 | −3.14 | +4.43 |
| 33 | +14.40 | +3.18 | +7.28 | 55 | +14.04 | −6.30 | +3.60 |
| 36 | +8.24 | −4.72 | +2.78 | 57 | +9.82 | −16.02 | −3.40 |
| 38 | +7.40 | −5.10 | +2.89 | 58 | +2.86 | −30.56 | −11.81 |

Here, the measured values represent the maximum value, the minimum value and the mean value of the data measured at 8 respective measured positions.

The conventional example of FIG. 8 shows the best one of the conventional molding method in the case where the thickness of a disc plate is 1.2 mm. When a distance from the center of the disc is before and after 22 to 25 mm, the index of double refraction is about 20 to 40 nm, and the index of double refraction is moved toward a negative direction when the distance from the center of the disc is 55 or more, and the index of double refraction becomes −30.66 nm at the maximum.

On the contrary, this embodiment shown in FIG. 7 exhibits the measured data in the case where the thickness of the disc is 0.6 mm. When a distance from the center of the disc is before and after 22 to 25 mm, the index of double refraction is about 20 to 35 nm in a negative direction opposite to that in the conventional example. Even in a ultra-thin type disc having a thickness of ½, the measured values are not changed in comparison with those in the conventional example, and even when a distance from the center of the disc is 55 mm or more, the index of double refraction is −17.38 nm at the maximum, which is excellent to the conventional example.

In FIG. 7 showing this embodiment, both ends of the graph exhibiting the index of double refraction deviate towards the negative direction. This means that the resin is filled into the cavity so as to satisfactorily reach an inner end portion thereof. That is, it is assumed that the shape of the disc product is excellent in the mechanical characteristics such as a warp, a plane and a strength.

As described above, according to the present invention, the injection filling process is conducted in a state where the mold clamping pressure is zero, and also the screw is pushed forward so that the quantity of a cushion of the melting resin within the heating cylinder is eliminated. This makes it unnecessary to control the quantity of the cushion through the pressure control of the injection unit. As a result, the quantity of injection can be extremely stabilized. Also, since no operation of the pressure control valve for decreasing the injection holding pressures $P_2$ and $P_3$ is required, the scale of the pressure setter which indicates the injection pressure is maintained in the maximum state from the start to the end. Thus, the method of the invention can cope with only the variation of the injection velocity.

Also, even in the molding cycle, the cooling time is, as is apparent from FIG. 3, 0.4 sec+3.5 sec+2.2 sec=6.1 sec. Thus, the cooling time is reduced in comparison with that in the conventional method which requires 7 sec at the shortest for obtaining the equivalent product.

As was apparent from the foregoing description, according to the method of molding a disc substrate of the present invention, even though the ultra-thin type disc has the temperature of the die assembly of 120° C. or less, the excellent index of double refraction can be obtained as shown in FIG. 1. Also, the regulations of the transfer and the mechanical characteristics are cleared. Further, the dispersion of the shots is greatly improved in comparison with the conventional method, and the cycle time (cooling time) can be shortened.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of molding a disc substrate, which comprises the steps of:

fitting a movable die and a fixed die for a disc substrate onto a movable platen and a fixed platen of a molding machine, respectively;

bringing said movable die and said fixed die into contact with each other through a mold closing operation where said movable platen is moved by a mold clamping cylinder;

filling a given quantity of melting resin into a cavity of said movable and fixed dies for the disc substrate from a nozzle of an injection unit through a screw within a heating cylinder while a mold clamping hydraulic pressure is zero; and after the completion of the injection process, implementing a mold clamping pressure control of one stage or a plurality of stages by application of a mold clamping pressure, and simultaneously conducting a process of cooling the resin to form a disc substrate.

2. A method of molding a disc substrate as claimed in claim 1, wherein said screw within said heating cylinder in the injection filling operation is advanced to its movable limit, the quantity of a cushion of the melting resin is eliminated, and a given quantity of melting resin is injected.

3. A method of molding a disc substrate as claimed in claim 1, wherein the step of implementing a mold clamping pressure control comprises applying a single mold clamping pressure while simultaneously conducting a process of cooling the resin.

4. A method of molding a disc substrate as claimed in claim 1, wherein the step of implementing a mold clamping pressure control comprises the steps of:

applying a first clamping pressure for a first predetermined period of time; and applying a second clamping pressure for a second predetermined period of time.

5. A method of molding a disc substrate as claimed in claim 4, wherein the first clamping pressure is greater than the second clamping pressure.

6. A method of molding a disc substrate as claimed in claim 4, wherein the step of implementing a mold clamping pressure control further comprises applying a third clamping pressure for a third predetermined period of time.

7. A method of molding a disc substrate as claimed in claim 6, wherein the first clamping pressure is greater than the second clamping pressure, and wherein the third clamping pressure is greater than the second clamping pressure.

* * * * *